United States Patent [19]
White

[11] Patent Number: 5,148,348
[45] Date of Patent: Sep. 15, 1992

[54] POLYMERIC ENCLOSURE FOR ELECTRICAL APPARATUS

[75] Inventor: Percy A. White, Clinton, Miss.

[73] Assignee: Westinghouse Electric Corp., Pittsburgh, Pa.

[21] Appl. No.: 716,185

[22] Filed: Jun. 17, 1991

[51] Int. Cl.$^5$ .............................................. H02B 1/04
[52] U.S. Cl. ........................................ 361/356; 174/67; 220/3.8; 439/212
[58] Field of Search .............. 312/223; 220/3.8, 3.9, 220/4.02, 242; 174/52.1, 58-60, 66, 67; 361/331, 355, 356, 357, 358, 360, 361, 363; 439/135, 136, 212, 213; 200/43.22

[56] References Cited

U.S. PATENT DOCUMENTS

| | | | |
|---|---|---|---|
| 3,278,807 | 11/1966 | Galante et al. | 317/119 |
| 3,634,732 | 1/1972 | Finger | 361/422 |
| 3,801,875 | 4/1974 | Morby et al. | 317/120 |
| 3,852,514 | 12/1974 | Lauben | 174/58 |
| 3,979,573 | 9/1976 | Burns | 219/10.55 |
| 4,118,754 | 10/1978 | Duggan | 361/355 |
| 4,517,623 | 5/1985 | Barner | 361/358 |
| 4,675,782 | 6/1987 | Hibbert et al. | 361/356 |
| 4,688,146 | 8/1987 | Newmark et al. | 361/364 |
| 4,698,727 | 10/1987 | Hibbert et al. | 361/356 |
| 4,717,987 | 1/1988 | Newmark et al. | 361/351 |
| 4,851,963 | 7/1989 | Miller | 361/356 |
| 4,897,048 | 1/1990 | Liebon | 439/212 |
| 4,916,574 | 4/1990 | Hancock et al. | 361/361 |
| 4,931,898 | 5/1990 | Cole | 361/361 |
| 4,931,902 | 5/1990 | Cole | 361/354 |
| 4,962,443 | 10/1990 | Cole | 361/356 |

Primary Examiner—Gerald P. Tolin
Attorney, Agent, or Firm—M. J. Moran

[57] ABSTRACT

A non-metallic enclosure for electrical apparatus has a housing and cover with a door pivotably mounted on the cover. A hood is attached to the housing such that when the door is attached to the cover and the cover is attached to the housing at least one pivotable connector will be behind the hood so that the door can only be nondestructively removed by removing the cover from the housing. Electrically conductive connectors and resilient snap-in members are preferably molded into the housing to secure bus bars and neutral bars to the housing.

12 Claims, 5 Drawing Sheets

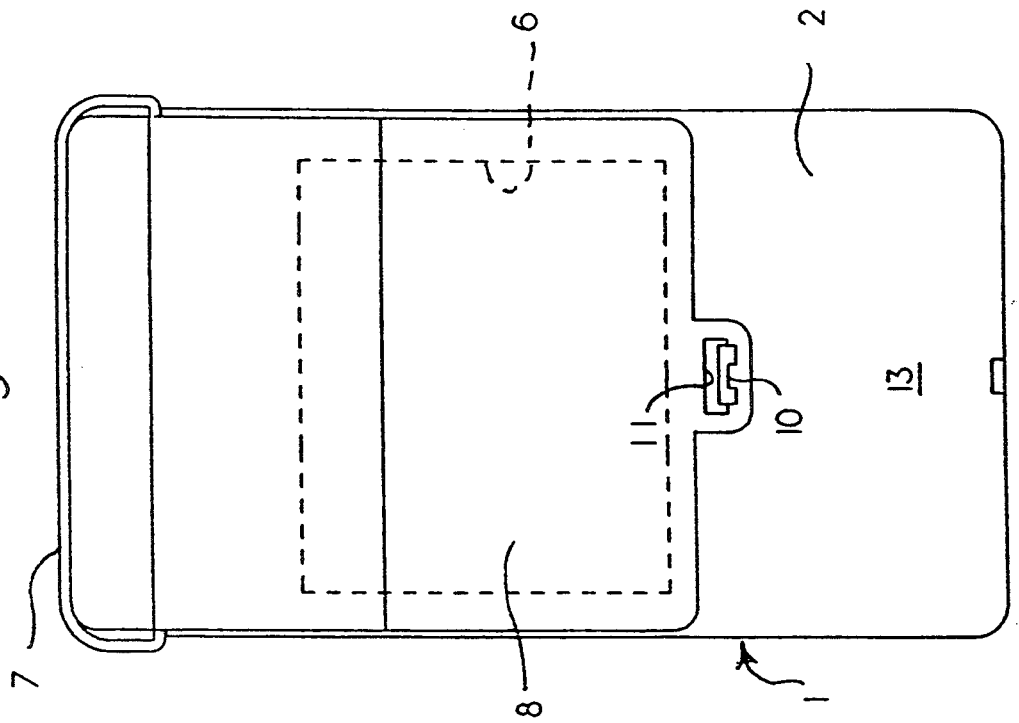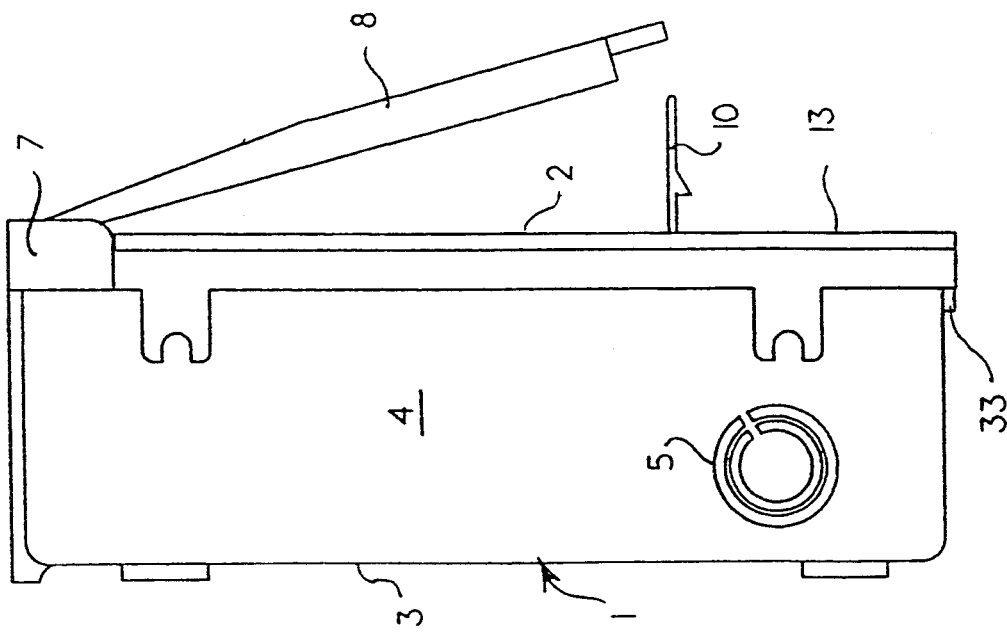

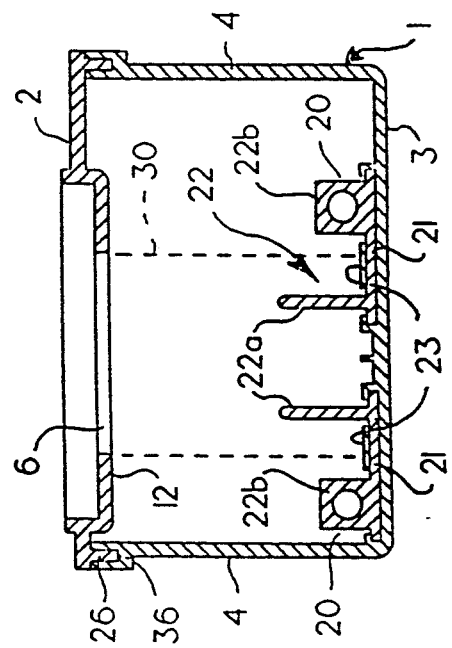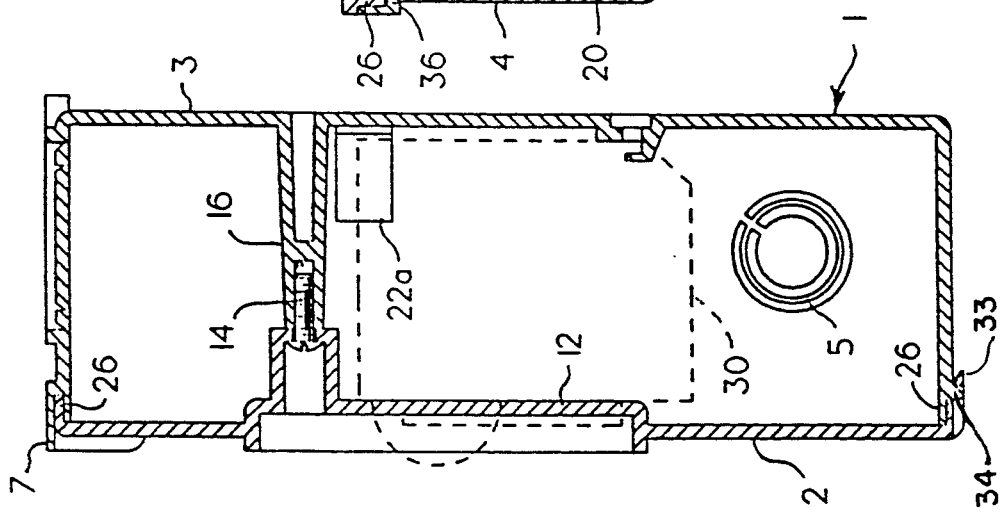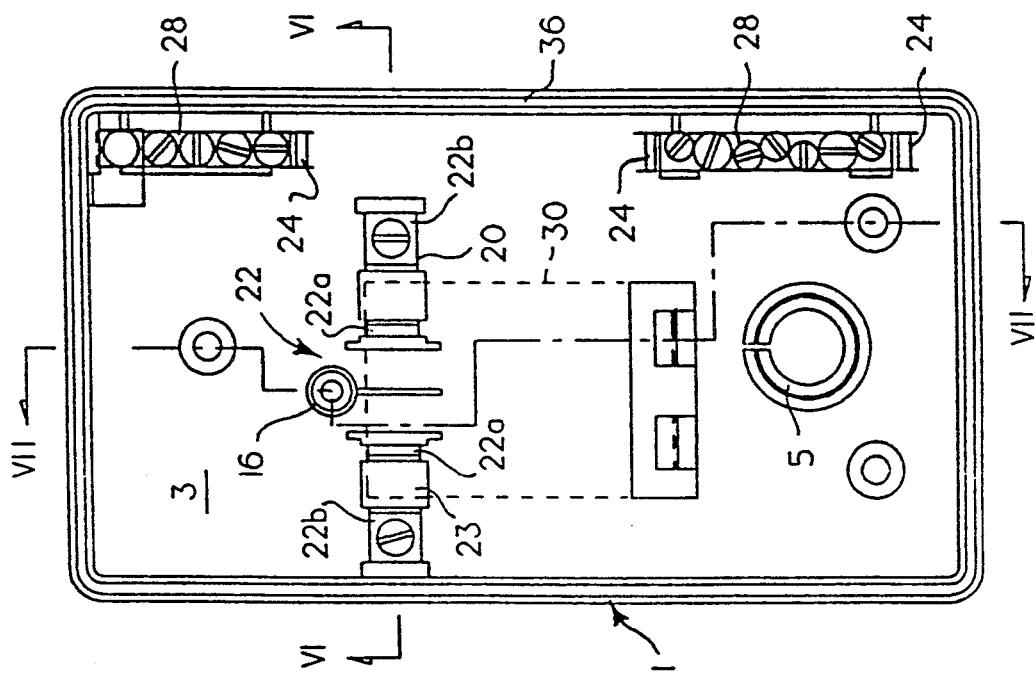

POLYMERIC ENCLOSURE FOR ELECTRICAL APPARATUS

CROSS REFERENCE TO RELATED APPLICATION

This application is related to design patent application Ser. No. 07/716,596 filed Jun. 17, 1991 by applicant and titled "Improved Appearance for Enclosure for Electrical Apparatus".

FIELD OF THE INVENTION

This invention relates to an enclosure for electrical apparatus such as circuit breaker panels or load centers.

BACKGROUND OF THE INVENTION

Circuit breaker panel boards, load centers and the like are normally enclosed within box-like structures. Many of these enclosures are metallic being mass produced from metal sheets in a succession of operations, including cutting, blanking, forming and welding to create a box like housing which must then be painted. The enclosure covers are similarly produced in a succession of operations. A number of components, including components mounted in and supporting elements, must then be assembled in a box-like housing. Since the metallic enclosure is electrically conductive, insulation must be incorporated into the mounting of bus bars and other components in the housing.

U.S. Pat. No. 3,852,514 to Lauben discloses a non-metallic, molded plastic electrical equipment enclosure for electrical equipment, such as a panel board or load center for circuit breakers having integrally formed back and side walls in the configuration of a box-like housing. A separate moldable plastic cover is placed on the housing to complete the enclosure. Lauben prefers to provide housing sidewalls which terminate in a parametrical lip circumscribing the open front of the housing. The lip telescopically interfits with a corresponding parametrical flange molded to and depending from the front wall of the cover. The cover can further be secured by tabs or screws. Lauben also teaches that the housing and the cover are formed of a suitable plastic, preferably a thermoplastic material such as phenyleneoxide thermoplastic and that thermoset materials may also be used.

In many installations it is important that the cover be securely attached to the housing so that it cannot be readily removed. In many applications a door is provided in the cover which can be locked through the use of a padlock placed in a lock tab passing from the cover through the door. If the cover or the door has been secured by exposed screws or hinges, the enclosure is easily entered by removing the screws or hinges. For many installations this is undesirable.

Many enclosures for electrical equipment are placed outside where they are exposed to rain, wind and snow. For such uses it is important that the enclosure be water-tight. To accomplish this purpose the art has provided seals on mating surfaces of the cover and housing or applied sealants to the enclosure. These practices increase the cost of the enclosure. There is, therefore, a need for a tamper proof molded enclosure for electrical components which is weather proof.

SUMMARY OF THE INVENTION

I provide a non-metallic enclosure for electrical components having a molded housing comprised of a backwall having integrally formed upstanding sidewalls and an integrally molded hood along one end of the housing. A molded cover is attached to the housing and engages the upstanding sidewalls. The cover has an opening over which a door may be placed. The door is fitted over the opening and attached to the cover by a pivotable attachment means or hinge placed under the hood such that when the cover is attached to the housing the door can only be non-destructively removed by pivoting the door away from the cover, thereby providing access to the hinge. In a present preferred embodiment it is necessary to remove the cover to detach the door. I further prefer to provide a molded cover which has a mounting portion extending behind the opening and adapted to receive a screw which passes through the mounting portion to attach the cover to the housing. In this configuration the mounting screw can only be accessed when the door is in an open position.

I also prefer to provide at least one electrically conductive member which has been molded into the backwall of the housing. The electrically conductive member preferably has a base with at least one contact extending upwardly therefrom. The base is positioned so that a portion of the backwall is molded over opposite faces of the base.

I further prefer to provide snap-in elements attached and preferably integrally mounted to the backwall of the housing. The snap in elements are sized and positioned to secure to the backwall a neutral bar, a grounding terminal bar or other components.

Other objects and advantages of the invention will become apparent as a description of a present preferred embodiment shown in the drawings proceeds.

BRIEF DESCRIPTION OF THE DRAWINGS

FIG. 2 is a front view of the embodiment of FIG. 1.

FIG. 3 is a left side view of the embodiment of FIG. 1 wherein the door has been pivoted to a partially open position.

FIG. 5 is a plan view showing the interior of the housing wherein bus bars have been attached to the backwall.

FIG. 6 is a cross sectional view taken along the line VI—VI of FIG. 5.

FIG. 7 is a sectional view taken along the line VII—VII of FIG. 5.

DESCRIPTION OF THE PREFERRED EMBODIMENTS

Figure 1:
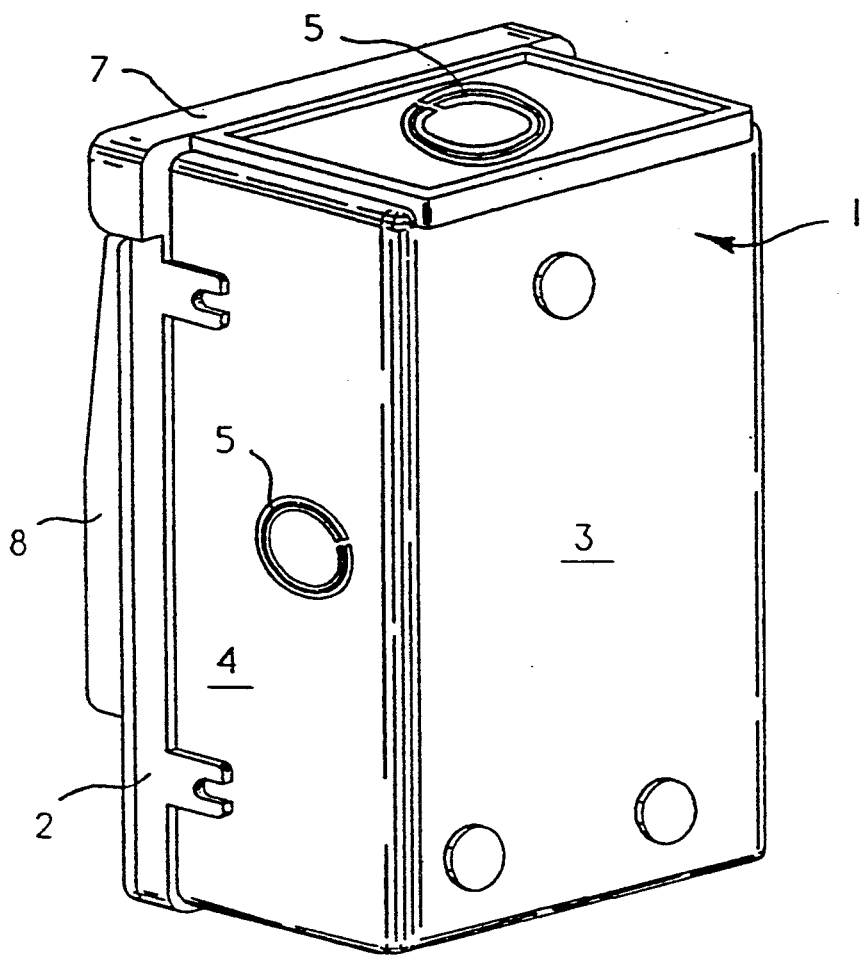
FIG. 1 is a perspective view of a present preferred embodiment of my non-metallic enclosure for electrical equipment.
Figure 4:
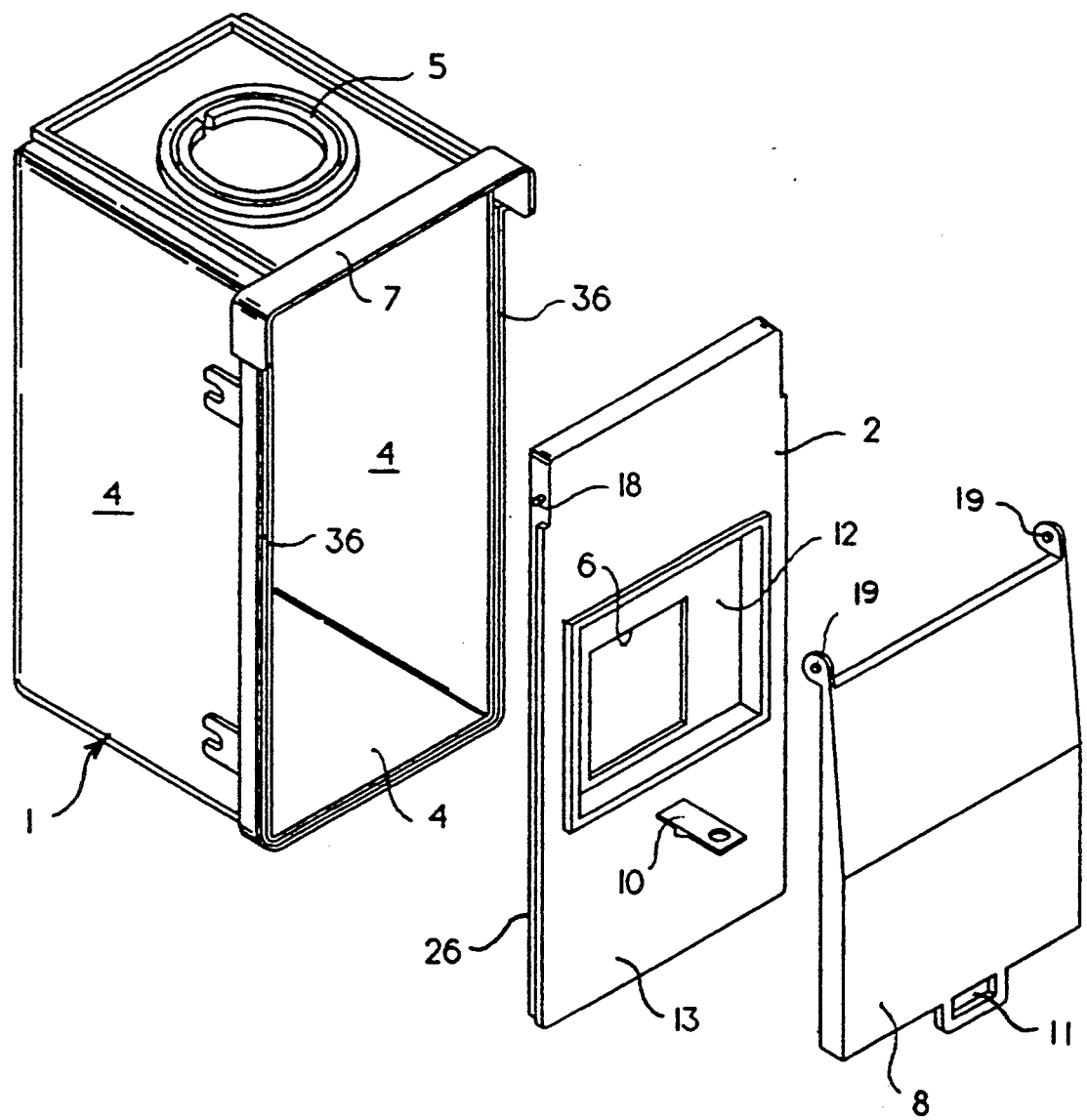
FIG. 4 is an exploded perspective view of the embodiment of FIG. 1.

My enclosure for electrical equipment is generally comprised of a housing 1 to which a cover 2 has been attached. The housing contains a backwall 3 having integrally molded upstanding sidewalls 4 and a hood 7 attached to the sidewalls at one end. Knock-outs 5 may be provided at appropriate locations in either the sidewall or the backwall. The cover 2 has a front 13 with an opening 6. I prefer to provide a lip 26 around the edge of the cover 2 which fits within a groove 36 in the sidewalls 4 of the housing. This configuration provides a water tight seal between the cover and the housing. As can be seen in FIG. 7, I prefer to provide a bridge 12 on the cover which bridge extends into the opening 6. I provide a hole in the bridge through which screw 14 passes to secure the cover onto post 16 which extends from backwall 3. This screw can only be accessed through the opening 6. Therefore, the cover cannot be nondestructively removed from the housing unless the door 8 is open. Alternatively, one can omit the bridge and have the screw pass through the cover at a point adjacent the opening 6, but under the door 8. I also prefer to provide an end tab 33 at the bottom of the cover to engage a projection 34 on the housing.

A door 8 is attached to the cover by a pivotable connector 9 having a hole 19. A pair of connectors 9 are provided at the top corners of the door 8. Each connector has a hole 19 for engagement of hub 18 on the side of the cover 2. The hub 18 is positioned so that the pivotable connector 9 will be behind the hood 7 when the cover is attached to the housing, the hood 7 being integrally molded along one end of the housing 1. Thus, door 8 can be pivotably opened by pulling the lower portion away from the cover as shown in FIG. 3. The hood 7 also prevents water from entering any space which may be present between the top of the door 8 and the cover 2. I prefer to provide a lock tab 10 on the cover 2 which extends through a slot 11 in the door. When the door is in a closed position as shown in FIGS. 1 and 2 a padlock can be placed through a hole in the tab 10 to retain the door in a closed position. Because the pivotable connectors 9 engage the hubs 18 behind hood 7 one cannot separate the door 8 from the cover 2 at the pivot connection to gain access to the screw 14 to disassemble the electrical enclosure. The pivotable connectors 9 and the hubs 18 can be separated only when the cover 2 is removed from the housing 1.

Turning now to FIGS. 5 and 6, I prefer to provide at least one electrically conductive member 20 molded into the backwall 3. This is accomplished by using an electrically conductive element 20 having a base 21 and at least one upstanding contact. The base 21 is positioned parallel to the backwall so that when molding occurs a portion of the base will be encircled by a portion of the backwall as shown in FIG. 6. The contacts 22 of the conductive element 20 may be prongs 22a into which a circuit breaker switch 30 (shown in chain line in FIG. 7) may fit or may be tabs 22b having holes for receipt of screws or other fasteners. Preferably the electrically conductive member 20 is made of aluminum. I prefer to make the housing from a plastic such as phenylene-oxide thermoplastic marketed by General Electric under the trademark NORYL. However, thermoset materials may also be used. Since this material is not conductive one need not use insulators between the housing and the electrical components mounted therein.

Figure 8:
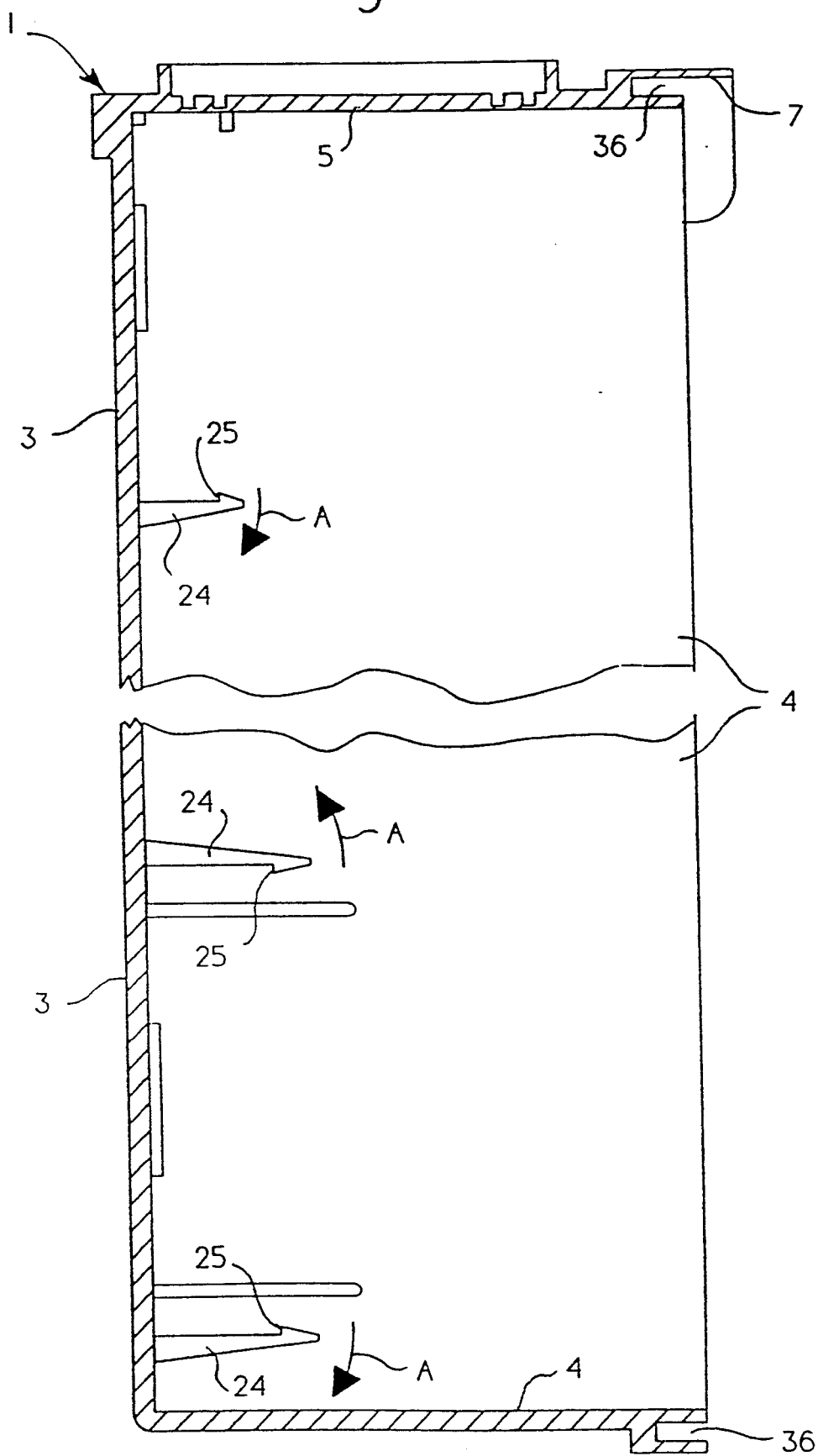
FIG. 8 is an enlarged, fragmentary view of a portion of the backwall and sidewalls showing the snap-in elements.

Referring now to FIGS. 5 and 8, I also prefer to provide snap-in elements 24 which are attached to the backwall. Preferably these snap in elements are molded into the backwall. Snap-in elements 24 have a shoulder 25 at one end. The snap-in elements are sufficiently resilient so that each element can be pivoted as indicated by the arrow A allowing a bus bar 28 or other component to be fitted adjacent to selected snap-in members 24. The resilience of the snap-in members 24 will cause each member to move against the bus bar 28 (FIG. 5) locking a portion of it under the shoulders 25 of the snap-in members 24.

While I have shown and described certain present preferred embodiments of the invention, it should be understood that the invention is not limited thereto but may be variously embodied within the scope of the following claims.

I claim:

1. A non-metallic enclosure for electrical apparatus, comprising:
   a) a molded, electrically insulative housing having a backwall and integrally formed, upstanding sidewalls;
   b) a molded insulative cover attached to the housing and engaging the upstanding sidewalls, the cover having an opening over which a door may be placed;
   c) a door sized to fit over the opening and pivotably connected to the cover by at least one pivotable connector; and
   d) a hood attached to the housing such that the at least one pivotable connector is behind the hood so that the door can only be nondestructively removed by removing the cover from the housing.

2. The non-metallic enclosure of claim 1 comprising a slot in said door and a lock tab attached to said cover, said lock tab extending through said slot.

3. The non-metallic enclosure of claim 1 comprising two resilient snap-in elements having predetermined size and positioning attached to the backwall of the housing; and an electrical component secured to the backwall by the resilient snap-in elements.

4. The non-metallic enclosure of claim 3 wherein the electrical component is a neutral bar.

5. The non-metallic enclosure of claim 3 wherein the snap-in elements are integrally formed with the backwall.

6. The non-metallic enclosure of claim 3 wherein the housing and snap-in elements comprise thermoplastic material.

7. The non-metallic enclosure of claim 1 also comprising at least one electrically conductive member molded into the housing.

8. The non-metallic enclosure of claim 7 wherein the electrically conductive member is a connector for circuit breaker switches.

9. The non-metallic structure of claim 7 wherein the electrically conductive member has a base and at least one upwardly extending contact and the electrically conductive member is molded into the backwall so that portions of the backwall are adjacent to opposite faces of the base.

10. The non-metallic structure of claim 7 wherein the electrically conductive member comprises aluminum.

11. The non-metallic enclosure of claim 1 wherein the cover has a peripheral lip and the housing has a circumferential groove in the sidewalls which groove is sized and positioned so that the lip fits with the groove.

12. The non-metallic enclosure of claim 1 also comprising a fastener securing the cover to the housing which fastener is positioned so as to be inaccessible when the cover is secured to the housing and the door is in a closed position.

* * * * *